(12) United States Patent
Mitsuhashi

(10) Patent No.: US 6,862,381 B2
(45) Date of Patent: Mar. 1, 2005

(54) CROSS-CONNECT OPTICAL SWITCH

(75) Inventor: Masashige Mitsuhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 10/132,411

(22) Filed: Apr. 25, 2002

(65) Prior Publication Data

US 2002/0159680 A1 Oct. 31, 2002

(30) Foreign Application Priority Data

Apr. 25, 2001 (JP) .................................. 2001-128154

(51) Int. Cl.[7] .............................................. G02B 6/26
(52) U.S. Cl. .......................................... 385/17; 385/18
(58) Field of Search ..................................... 385/16–19

(56) References Cited

U.S. PATENT DOCUMENTS

| | | | | |
|---|---|---|---|---|
| 5,841,917 A | * | 11/1998 | Jungerman et al. | 385/17 |
| 6,256,430 B1 | * | 7/2001 | Jin et al. | 385/18 |
| 6,445,842 B1 | * | 9/2002 | Dhuler et al. | 385/17 |
| 6,453,083 B1 | * | 9/2002 | Husain et al. | 385/17 |
| 6,522,800 B2 | * | 2/2003 | Lucero | 385/16 |
| 6,606,429 B1 | * | 8/2003 | Carberry et al. | 385/23 |

FOREIGN PATENT DOCUMENTS

| | | |
|---|---|---|
| JP | 6-208065 | 7/1994 |
| JP | 11-223778 | 8/1999 |
| JP | 2000-162520 | 6/2000 |

* cited by examiner

*Primary Examiner*—Edward J. Glick
*Assistant Examiner*—Thomas R Artman
(74) *Attorney, Agent, or Firm*—Scully, Scott, Murphy & Presser

(57) ABSTRACT

A cross-connect optical switch comprises (a) an input array of optical input paths arranged in a first direction; (b) an output array of optical output paths arranged in a second direction different from the first direction; (c) a switching region formed between an output end of the input array and an input end of the output array; (d) a mirror array of optical reflection mirrors arranged in the switching region; and (e) a mirror driver for driving electromagnetically the mirror array. Each of the mirrors of the mirror array has a reflection plane perpendicular to a bisector between the first and second directions and is supported in such a way as to be displaceable along the reflection plane between a standby position and an operation position. Light beams emitted from the input array are reflected by the corresponding mirrors to be sent to the output array in the operation state, and pass near the corresponding mirrors in the standby state. Switching operation between several hundreds of optical input paths and several hundreds of optical output paths is realized.

7 Claims, 5 Drawing Sheets

CROSS-CONNECT OPTICAL SWITCH

BACKGROUND OF THE INVENTION

1. Field of the Invention

The present invention relates generally to optical communication systems. More particularly, the invention relates to a cross-connect optical switch for switching optical paths, which is applicable to large-scale switching operation between several hundreds of optical input paths and several hundreds of optical output paths.

2. Description of the Related Art

For example, Wavelength-Division Multiplexing (WDM) optical communication systems require a device for switching a lot of optical signals that have been separated from each other using the wavelength difference and for sending the signals thus switched to their different paths. A "cross-connect switch" is a device to meet this requirement.

In recent years, there has been the growing need to increase the channel capacity in optical communication systems. To achieve this need, the scale of the cross-connect switch has to be enlarged as much as possible. In other words, the cross-connect switch needs to have a capability to switch as many optical input paths as possible to output them to as many optical output paths as possible.

There have been various types of cross-connect optical switch, one of which is designed to switch mechanically the interconnections between optical fibers. An example of this type is disclosed in the Japanese Non-Examined Patent Publication No. 6-208065 published in 1994. This prior-art switch comprises a large number of 1×2 (i.e., one input path and two output paths) mechanically-operated optical switch elements cascade-connected. Each of the 1×2 switch elements switches alternately the input path to one of the two output paths by mechanically shifting the necessary switch element. Thus, this prior-art switch provides the M×N optical-path switching operation.

With the prior-art optical switch disclosed by the Publication No. 6-208065, it is possible to realize the switching operation between several tens of optical input paths and several tens of optical output paths. However, the switching operation between several hundreds of optical input paths and several hundreds of optical output paths is unable to be realized. The reason is as follows.

Specifically, the count of necessary control lines for the mechanically-operated switch elements is proportional to the square of the count of these elements. Therefore, if the prior-art optical switch disclosed by the Publication No. 6-208065 is applied to the switching operation between several hundreds of optical input paths and several hundreds of optical output paths, the count of necessary control lines will be enormous. As a result, the switch size will be too large and at the same time, the switch price will be unrealistically high.

An example of the prior-art cross-connect optical switches has a configuration with optical reflection mirrors for switching optical paths. With the prior-art optical switch of this type, input optical signals are emitted into the atmosphere from optical fibers or optical waveguides and then, they are reflected by mirrors located in the atmosphere to reenter other optical fibers or optical waveguides, thereby conducting a desired optical-path switching operation. Therefore, the above-identified disadvantage that the switch size is too large and the switch price is unrealistically high can be solved. Thus, there is a high possibility to realize a switching operation between several hundreds of optical input paths and several hundreds of optical output paths. However, this has not been realized so far.

With the prior-art cross-connect optical switches using optical reflection mirrors described above, the reflection mirrors for optical path switching are typically driven electrostatically, piezoelectrically, or electromagnetically, The Japanese Non-Examined Patent Publication No. 11-223339 published in 1999 discloses a cross-connect optical switch, which comprises a silicon substrate, a switching space formed in the substrate, and optical waveguides formed in the substrate in such a way as to be intersected with each other in the switching space A signal light beam emitted formed one of the waveguides is turned to the other waveguide with a displaceable reflection mirror provided in the switching space. The mirror is displaced in the space by the magnetic force generated by an electromagnet provided outside the substrate. In other words, if the mirror is shifted to a specific operation position in the space, the optical signal emitted from one of the waveguides is reflected by the mirror thus shifted and is entered the other waveguide as desired. If the mirror is removed from the operation position, the optical signal is not reflected by the mirror and therefore, it is sent through the same waveguide by way of the space.

When switching the optical paths, a specific pulsed electrical current is supplied to the electromagnet to generate a magnetic force. By the magnetic force thus generated, the mirror is shifted in the space. To make the shift or motion of the mirror(s) smoother, a mirror guide portion is formed in the substrate. This portion is formed by inner walls of the substrate.

With the prior-art cross-connect optical switch disclosed by the Publication No. 11-223778, if the pulsed electrical current is supplied to the electromagnet on the switching operation, the ferromagnetic member of the electromagnet is magnetized. Thus, even if the supply of the electrical current is stopped after the switching operation is completed, the external magnetic field is maintained with the ferromagnetic member thus magnetized. As a result, the switched state of the optical paths is kept unchanged even after the supply of the electrical current is stopped. This leads to reduction of power consumption by the switch.

Furthermore, the Japanese Non-Examined Patent Publication No. 2000-162520published in 2000 discloses a cross-connect optical switch, where optical reflection mirrors are attached to a substrate by way of supports and electromagnets are provided near the mirrors. These electromagnets are located on a holder. Magnetizable elements, which are magnetizable by the magnetic fields generated by the electromagnets, are attached to the mirrors. If a specific electrical current is supplied to a desired one of the electromagnets to generate a magnetic field, the corresponding magnetizable element is magnetized by the magnetic field, resulting in an attractive force between the electromagnet and the corresponding mirror. Due to this attractive force, a two- or three-dimensional displacement of the mirror will occur while holding the mirror on the substrate with the support. On switching operation, a specific pulsed electrical current is supplied to a desired one of the electromagnets to generate a magnetic field, thereby causing a displacement of the mirror in a desired direction by a specific distance.

With the prior-art cross-connect switch disclosed by the Publication No. 2000-162520, like the prior-art cross-connect switch disclosed by the Publication No. 11-223778, even if the supply of the current is stopped after the switching operation is completed, the external magnetic field is kept with the magnetizable element thus magnetized. As a result, the switched state of the optical path is kept unchanged, which reduces the power consumption by the switch.

The Publication No. 2000-162520 discloses an example of a large-sized cross-connect optical switch, which comprises an array of optical reflection mirrors attached to a substrate by way of supports, and an array of electromagnets provided for the corresponding mirrors. With this switch structure, optical signals supplied through an array of optical input paths can be reflected to turn their directions by the mirrors if the desired mirrors are displaced by driving the corresponding electromagnets. Thus, the optical signals can be sent to an array of optical output paths extending in different directions from those of the array of optical input paths.

As explained above, with the optical switch using the optical reflection mirrors for switching the optical paths, there is a high possibility to realize a large-sized cross-connect optical switch. However, with the prior-art switch disclosed by the Publication No. 11-223778, the reflection mirror, which is movably provided in the switching space of the silicon substrate, is selectively displaced in a direction (e.g., in an upper or lower direction) along the mirror guide to insert the mirror into the optical path or remove therefrom, thereby switching the desired path. Thus, there are disadvantages that the mirror guide is essential for stabilizing the displacement of the mirror, and that the mirror guide is located at the intersection of the optical paths. As a result, to realize a large-scale optical switch capable of switching operation between several hundreds of optical input paths and several hundreds of optical output paths, the configuration will be too complicated. This means that the switch structure of the Publication No. 11-223778 is difficult to be adopted for this purpose.

With the prior-art cross-connect switch disclosed by the Publication No. 2000-162520, the array of optical reflection mirrors, which are attached to the substrate by way of the supports in such a way as to form cantilevers, are displaced with the array of electromagnets located on the holder, thereby switching the optical paths. Thus, there is an advantage that the mirrors are displaceable three-dimensionally. However, this advantage will induce a disadvantage that the posture of the mirrors needs to be controlled extremely precisely, and that the posture of the mirrors is unstable unless some contrivance is applied to keep the posture unchanged.

Moreover, if two or more electromagnets are provided for each of the mirrors, the count of necessary control lines for the electromagnets will be twice or more. In this case, there will arise the same problem as explained with respect to the prior-art switch disclosed by the Publication No. 6-208065.

With prior-art cross-connect optical switches formed to drive the reflection mirror electrostatically for optical path switching, there is a problem that electrical charge increase and/or leakage is/are likely to occur, and that the operation is unstable because they are susceptible to environmental conditions.

SUMMARY OF THE INVENTION

Accordingly, an object of the present invention is to provide a cross-connect optical switch that copes with switching operation between several hundreds of optical input paths and several hundreds of optical output paths.

Another object of the present invention is to provide a cross-connect optical switch that is simple in structure and that is precise and stable in operation.

Still another object of the present invention is to provide a cross-connect optical switch that is not susceptible to environmental conditions and that is operable stably against environmental conditions.

The above objects together with others not specifically mentioned will become clear to those skilled in the art from the following description.

A cross-connect optical switch according to the invention comprises:

(a) an input array of optical input paths arranged in a first direction;

(b) an output array of optical output paths arranged in a second direction different from the first direction;

(c) a switching region formed between an output end of the input array and an input end of the output array;

(d) a mirror array of optical reflection mirrors arranged in the switching region; and (e) a mirror driver for driving electromagnetically the mirror array;

wherein each of the mirrors of the mirror array has a reflection plane perpendicular to a bisector between the first and second directions and is supported in such a way as to be displaceable along the reflection plane between a standby position and an operation position;

and wherein light beams emitted from the input array are reflected by the corresponding mirrors to be sent to the output array in the operation position, and pass near the corresponding mirrors in the standby position.

With the cross-connect optical switch according to the invention, each of the mirrors of the mirror array has a reflection plane perpendicular to the bisector between the first and second directions. Each of the mirrors is displaceable along the corresponding reflection plane between the operation position and the standby position. Therefore, the angle of the reflection plane is kept constantly. Thus, if the mirror is displaced to the operation position while keeping the angle unchanged, the light beam emitted from the corresponding input path can be reflected as desired. If the switching operation is unnecessary, the mirror is placed in the standby position, where the light beam emitted from the corresponding input path is not affected by the mirror. As a result, the switching operation is precise and stable.

Because of the same reason as above, it is sufficient that the mirror driver moves the mirrors along their reflection planes. In other words, it is sufficient that each of the mirrors is movable in a single direction (i.e., the direction perpendicular to the bisector), and that the mirror driver moves each mirror in the same direction. Accordingly, the mirror driver and the mirrors are simple in structure. Moreover, since it is sufficient that the mirror driver comprises one electromagnet and one magnetic piece or member for each of the mirrors, the count of control lines for the electromagnets will not be too many. As a result, the switch of the invention copes with switching operation between several hundreds of optical input paths and several hundreds of optical output paths.

Furthermore, the mirror driver drives the mirror array electromagnetically, not electrostatically. Thus, the operation of the mirror driver is not susceptible to environmental conditions As a result, the switch is operable stably against environmental conditions.

In a preferred embodiment of the switch according to the invention, each of the mirrors is attached to an elastic supporting member whose end is fixed to a base. The mirror driver comprises an electromagnet fixed near each of the mirrors and a magnetic member attached to the supporting member. If an electrical current is supplied to the electromagnet, the corresponding magnetic member is magnetized to generate an attraction force. The mirror is displaceable between the standby position and the operation position using the attraction force. In this embodiment, there is an additional advantage that the structures of the mirror and the mirror driver are simplified.

Preferably, the electromagnet is attached to an upper substrate located approximately parallel to the base. In this case, it is preferred that the upper substrate is made of a transparent material for visible light. This is because the switching status of the optical paths can be observed from the outside of the switch.

Preferably, the electromagnet is located on an opposite side to the corresponding mirror with respect to an extension of the corresponding input path. In this case, by simply displacing the mirror between the standby and operation positions without changing the angle of the reflection plane, the light beam emitted from the corresponding input path can be reflected if necessary and at the same time, the beam in question can be made not to be affected by the mirror if unnecessary.

In another preferred embodiment of the switch according to the invention, the standby position of the mirror and the intersection between an extension of the corresponding input path and an extension of the corresponding output path is apart from each other by a distance A in a direction perpendicular to the bisector and at the same time, the standby and operation positions are apart from each other by a distance B larger than A. In this embodiment, there is an additional advantage that when the mirror is unnecessary, the light beam emitted from the corresponding input path is not affected by the mirror by simply placing the mirror in the standby position. On the other hand, if the mirror is necessary, the light beam emitted from the corresponding input path is reflected by the mirror by simply placing the mirror in the operation position, thereby sending it to the desired output path.

In still another preferred embodiment of the switch according to the invention, an optical lens is provided near each of the output end of the input array and the input end of the output array. One focus of the lens is designed to approximately accord with the output end or the input end and the other focus is designed to approximately accord with the mirror located at the furthest position on an extension of the corresponding input or output path. In this embodiment, there is an additional advantage that the optical insertion loss is suppressed when the light beam emitted from the corresponding input path is reflected by the reflection plane of the mirror located at the furthest position on an extension of the corresponding input or output path.

In a further preferred embodiment of the switch according to the invention, the reflection mirror and the electromagnet are arranged at each of the intersections between the extensions of the optical input paths and the extensions of the optical output paths. In this embodiment, there is an additional advantage that optical path switching can be conducted between all of the input paths and all of the output paths.

Preferably, the reflection mirror is held in the standby or operation position using the residual magnetism of the magnetic member or piece. In this case, it is preferred that the current is intermittently supplied to the electromagnet at a specific time intervals in such a way that the mirror is kept in the standby or operation position. There is an additional advantage that the optical paths switched can be kept stably for a long time without using dedicated circuits and parts.

Preferably, each of the input paths is formed by an optical fiber or optical waveguide, which is applicable to each of the output paths.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
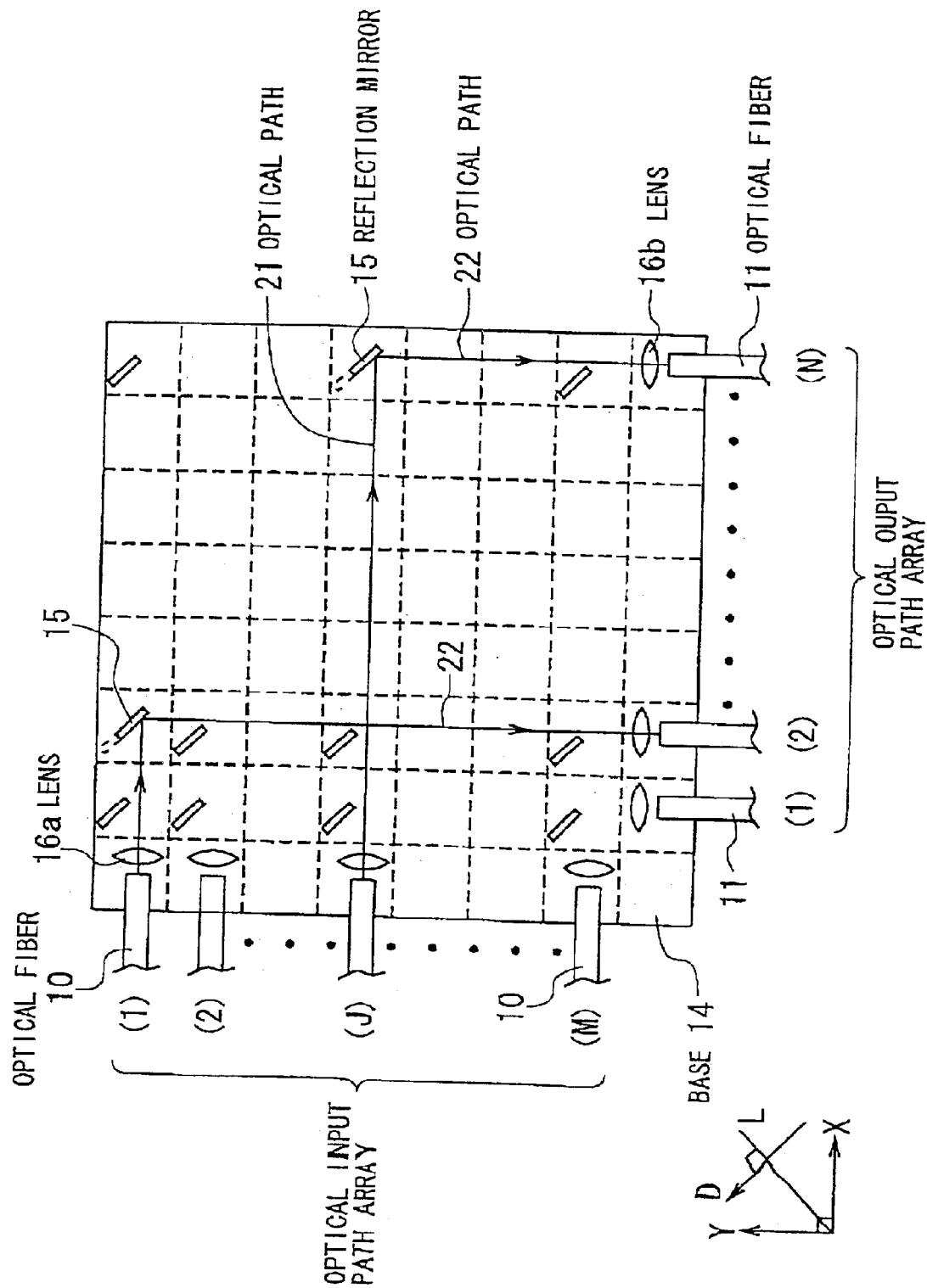
FIG. 1 is a schematic plan view showing the structure of a cross-connect optical switch according to an embodiment of the invention, where the upper substrate is omitted for clarification.

Preferred embodiments of the present invention will be described in detail below while referring to the drawings attached.

Figure 2:
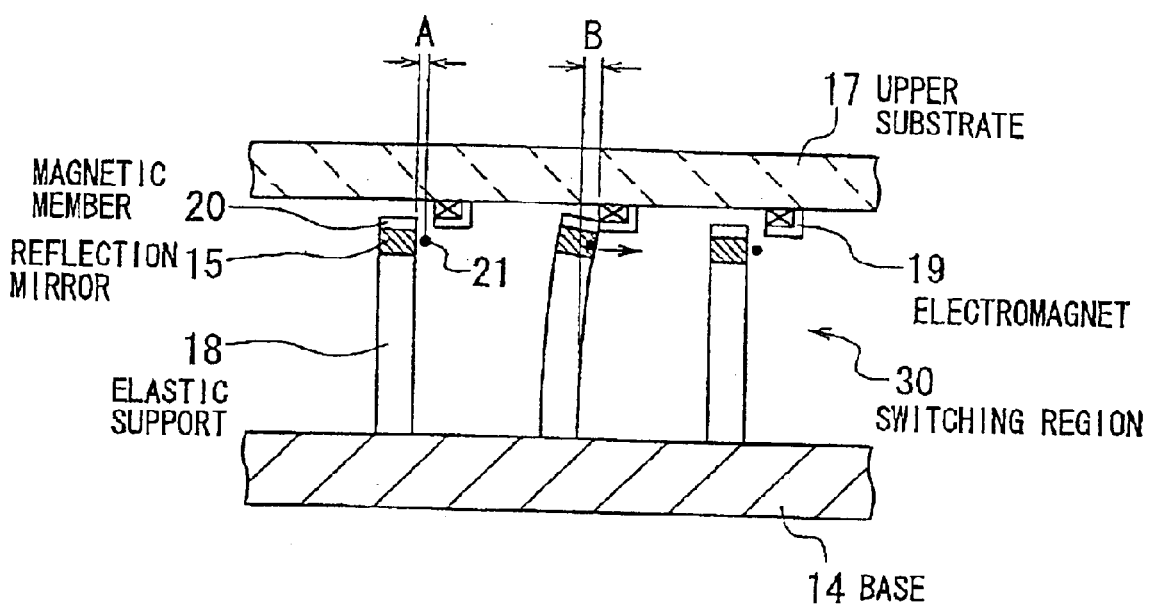
FIG. 2 is a schematic, partial, cross-sectional view along the reflection plane of the mirror, which shows the structure of the switch according to the embodiment of FIG. 1.
Figure 3:
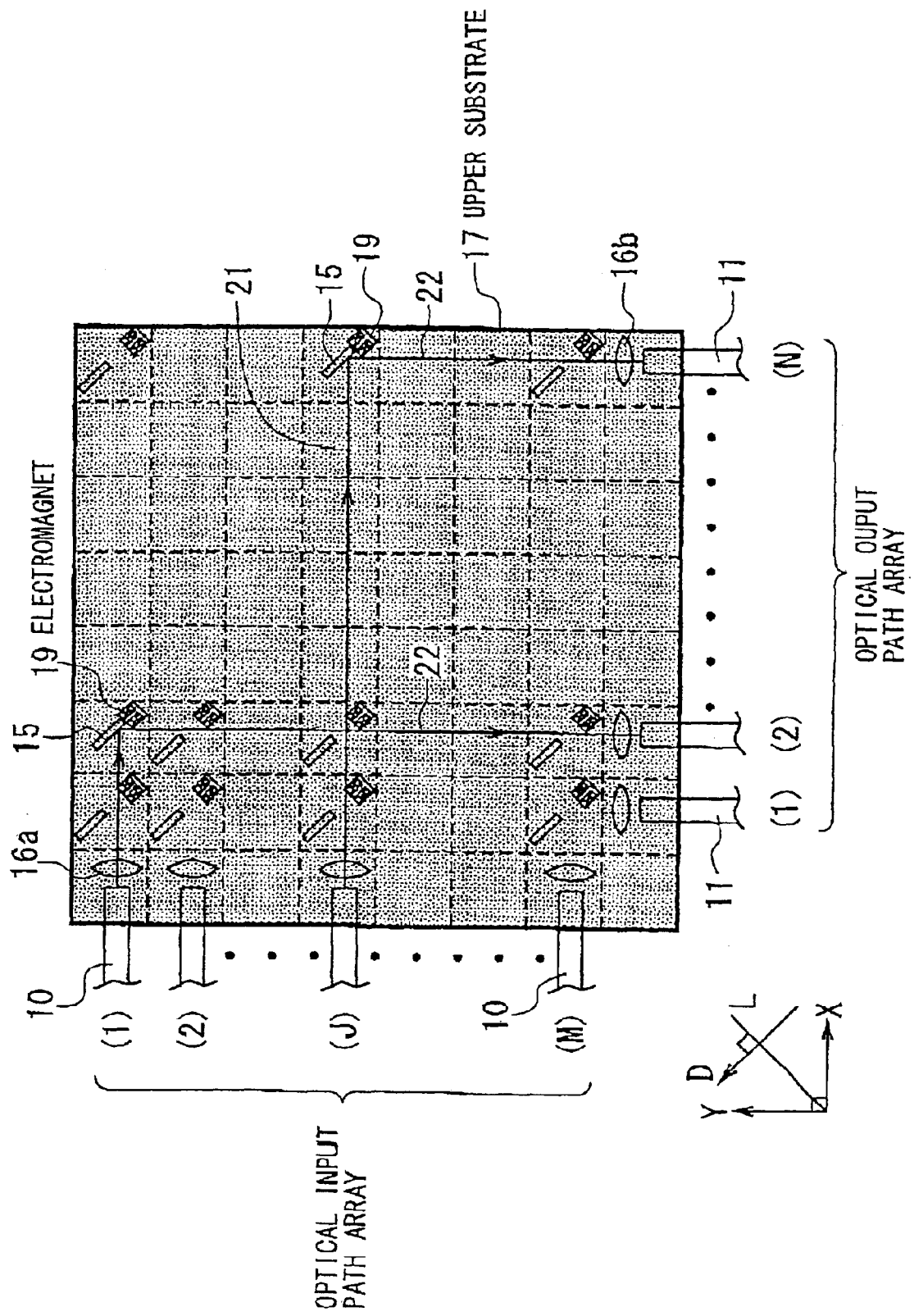
FIG. 3 is a schematic plan view of the switch according to the embodiment of FIG. 1.

FIGS. 1 to 3 show the schematic structure of a cross-connect optical switch according to an embodiment of the invention.

As shown in FIG. 1, the switch comprises a base 14 formed by a square, rigid plate, (M×N) optical reflection mirrors 15 fixed on the flat surface of the base 14, M optical fibers 10 arranged in the X direction in a plane parallel to the surface of the base 14, and N optical fibers 11 arranged in the Y direction in the same plane as the fibers 10, where the Y direction is perpendicular to the X direction. M and N are integers greater than unity.

The M fibers 10 are arranged along one edge (along the left side edge in FIG. 1) at equal intervals, forming an optical input array. On the other hand, the N fibers 11 are arranged along the other edge (along the bottom edge in FIG. 1) at equal intervals, forming an optical output array perpendicular to the optical input array.

The extensions of the fibers 10 forming the input array, i.e., the optical paths 21 of light beams emitted from the output ends of the fibers 10, and the extensions of the fibers 11 forming the output array, i.e., the optical paths 22 of light beams entering the input ends of the fibers 11, are intersected at (M×N) intersections. The mirrors 15 are arranged near the respective intersections. Thus, the count of the mirrors 15 is (M×N) too.

Optical lenses 16a are arranged near the respective output ends of the fibers 10 forming the input array. One focus of each lens 16a is in accordance with the output end of the corresponding fiber 10 while the other focus thereof is in accordance with the reflection plane of the mirror 15 located at the furthest position on the corresponding path 21. Thus, there is an additional advantage that the optical loss is decreased when a light beam emitted from the input array is reflected by the mirror 15 located at the furthest position on the corresponding input or output array.

Similarly, optical lenses 16b are arranged near the respective input ends of the fibers 11 forming the output array. One focus of each lens 16b is in accordance with the input end of the corresponding fiber 11 while the other focus thereof is in accordance with the reflection plane of the mirror 15 located at the furthest position on the corresponding path 22.

Each mirror 15 has a flat reflection plane. The reflection plane is set to be in a direction D perpendicular to the bisector L between the optical paths 21 (i.e., the X direction) connected to the input array fibers 10 and the optical paths 22 (i.e., the Y direction) connected to the output array fibers 11. The mirrors 15 are displaceable in the direction D.

As shown in FIG. 2, elastic supports 18 formed by elongated (in other words, strip-shaped) elastic plates are fixed onto the surface of the base 14. The supports 18 are arranged near the respective intersections between the optical paths 21 and 22. Thus, the count of the supports 18 is (M×N). As clearly shown in FIG. 2, the lower end of each support 18 is secured to the base 14 in such a way as to form a vertical cantilever.

Each mirror 15, which is attached to the upper end of the corresponding support 18, is displaceable in the direction D parallel to the reflection plane of the mirror 15 according to the elastic deformation of the support 18. A magnetic piece 20 is attached to the upper end of the support 18.

As shown in FIGS. 2 and 3, an upper substrate 17 is provided over the base 14 to be parallel to the same. The upper substrate 17 has the same square shape and the same size as those of the base 14. The substrate 17 is fixed to the base 14 at a specific distance. Here, the substrate 17 is made of a transparent glass plate with respect to visible light. The mirrors 15 are located in the space 30 between the base 14 and the substrate 17. The space 30 is used as the switching region for the optical paths 21 and 22.

Electromagnets 19 are attached to the lower surface of the upper substrate 17. These electromagnets 19 are arranged near the respective intersections between the optical input paths 21 and the optical output paths 22. Therefore, the count of the electromagnets 19 is (M×N). In other words, the electromagnets 19 are in one-by-one correspondence with the supports 18 (i.e., the mirrors 15). The electromagnets 19 are located near the magnetic pieces 20 fixed at the uppermost positions of the corresponding supports 18. The electromagnets 19 are located on the opposite side to the corresponding supports 18 with respect to the corresponding paths 21.

Figure 5A:
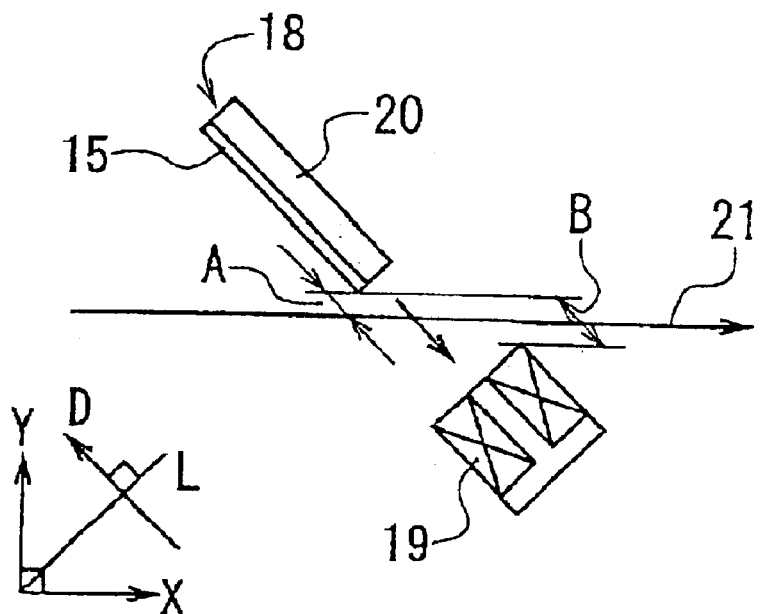
FIGS. 5A and 5B are schematic views showing the displacement of the mirror between the standby and operation positions with the use of the electromagnet and the magnetic member in the switch according to the embodiment of FIG. 1, respectively.

The mirrors 15 are displaceable in the direction D between the "standby positions" and the "operation position" while keeping the angle of the reflection plane in the same direction D. In other words, in the standby position, as shown in FIG. 5A, the distance or shift between the mirror 15 and the corresponding optical path 21 extending from the fiber 10 in the direction X is A. The distance between the mirror 15 in question and the corresponding electromagnet 19 is B, where B is greater than A. In the standby position, the mirror 15 is apart from the path 21 and therefore, the light beam is allowed to pass through the vicinity of the corresponding mirror 15.

Figure 5B:
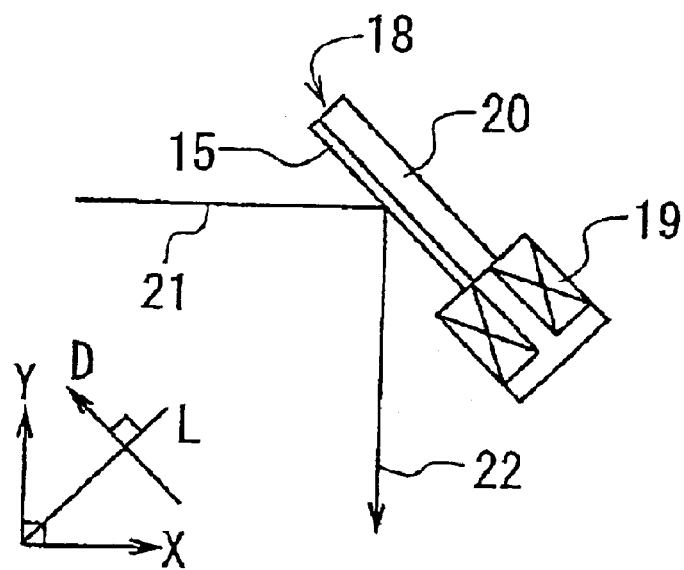

In the operation position, as shown in FIG. 5B, the mirror 15 is displaced by the distance B to be contacted with the corresponding electromagnet 19. This means that the mirror 15 is located on the path 21. Thus, the beam is reflected by the reflection plane of the mirror 15 and is turned perpendicularly to the Y direction, entering the corresponding fiber 11. Thus, the optical path switching of the signal beam is completed.

Next, the operation of the above-described cross-connect optical switch according to the embodiment of the invention is explained below in detail.

When the light beams emitted from the corresponding input fibers 10 in the X direction need not to enter the output fibers 11, the mirrors 15 are held in the standby position, as shown in FIG. 5A. In this state, the beams emitted from the output ends of the fibers 10 go through the paths 21 and pass through the vicinities of the mirrors 15. On the other hand, when the light beams emitted from the corresponding input fibers 10 in the X direction need to enter the output fibers 11, the mirrors 15 are moved to the operation position, as shown in FIG. 5B. In this state, the beams emitted from the output ends of the fibers 10 to the switching space 30 are reflected by the corresponding mirrors 15 and turned to the Y direction. Thereafter, the beams thus turned enter the corresponding fibers 11. Thus, the direction of the beams is changed perpendicularly and the destination thereof is switched to the desired fibers 11.

The displacement between the standby and operation positions is realized in the following way using the electromagnets 19 fixed too the upper substrate 17 and the magnetic pieces 20 fixed to the supports 18 (i.e., the mirrors 15).

Here, as shown in FIG. 1, it is supposed that the light beam emitted from the first fiber 10(1) of the input array is entered to the second fiber 11(2) of the output array.

In this case, one of the N mirrors 15 (i.e., the supports 18) arranged along the path 21 of the fiber 10(1), which is located near the intersection between the path 21 of the fiber 10(1) and the path 22 of the fiber 11(2), is chosen and displaced to the operation position. The remaining (N−1) mirrors 15 need to be kept in the standby position.

Thereafter, a specific electrical current is supplied to the electromagnet 19 corresponding to the mirror 15 (i.e., support 18) in question, thereby generating a magnetic field in the vicinity of the electromagnet 19. As a result, the magnetic piece 20 fixed to the support 18 of the mirror 15 in question is magnetized to form an attractive force between the electromagnet 19 and the piece 20. Since the electromagnet 19 is fixed to the upper substrate 17, the elastic support 18 is deformed and the piece 20 is contacted with the electromagnet 19. In this way, the mirror 15 in question is displaced from the standby position of FIG. 5A to the operation position of FIG. 5B.

The principle of this switching operation is explained below with reference to FIG. 4.

Figure 4:
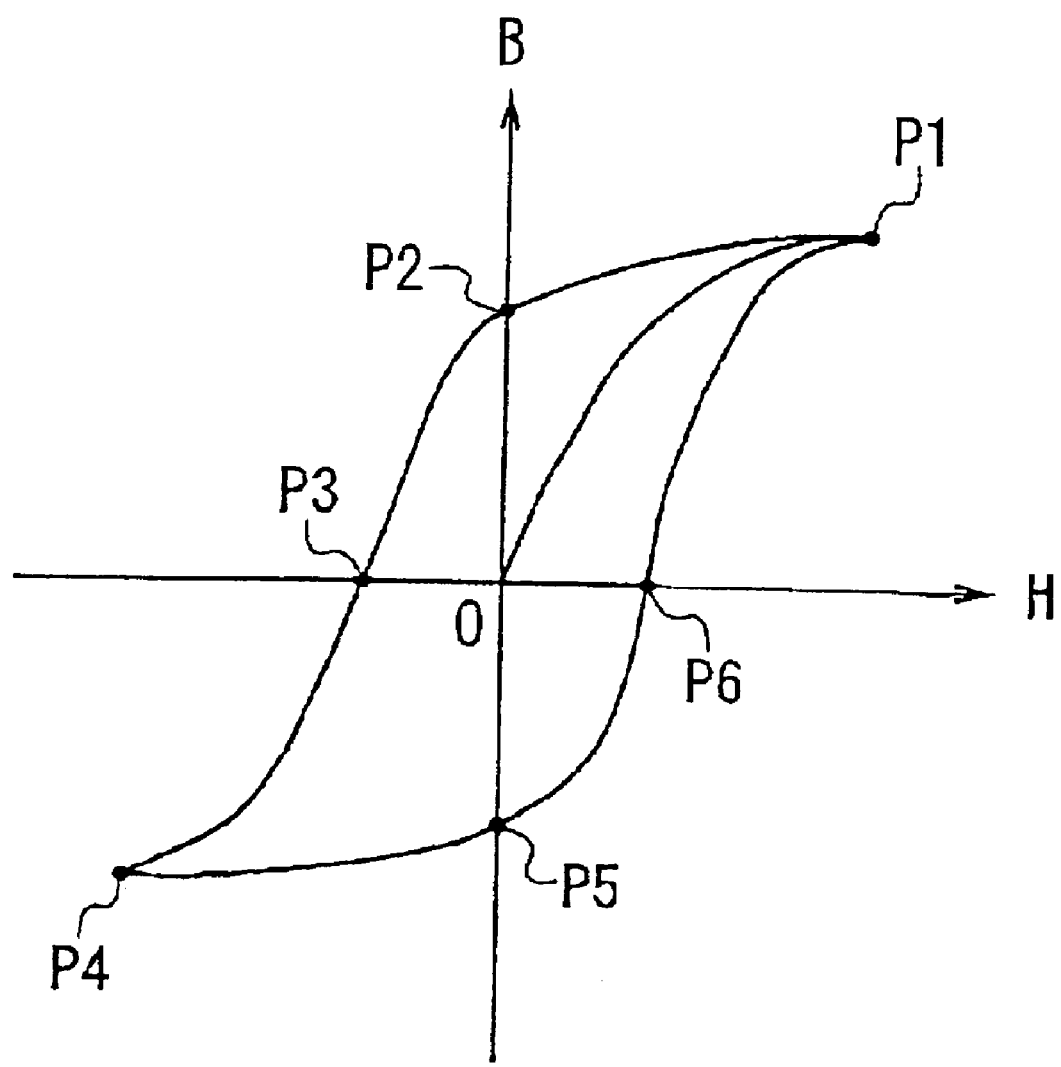
FIG. 4 is a schematic characteristic diagram showing the change of the magnetic-flux density B as a function of the magnetomotive force H of the electromagnet used in the switch according to the embodiment of FIG. 1.

Before an electrical current is supplied to the electromagnet 19, both the magnetomotive force H applied to the electromagnet 19 and the magnetic-flux density B generated by the electromagnet 19 are zero, i.e., the state is located at the origin O of the graph of FIG. 4. Thereafter, when an electrical current is supplied to the corresponding electromagnet 19 to generate a magnetic field, the state is shifted to the position P1 from the origin O. In this state, the magnetic piece 20 fixed to the support 18 of the mirror 15 is magnetized and then, the piece 20 is contacted with the electromagnet 19 with a resultant attractive force. In other words, the mirror 15 is displaced from the standby position to the operation position.

In this way, the light beam emitted from the input fiber 10(1) is reflected by the mirror 15 in question and then, enters the desired output fiber 11(2).

Subsequently, the supply of an electrical current to the electromagnet 19 is stopped, the magnetomotive force H becomes zero and the state is shifted to the point P2. At this time, a residual magnetism is left in the piece 20 and therefore, the attractive force remains, which keeps the mirror 15 in its operation position.

When the need to enter the beam emitted from the fiber 10(1) to enter the fiber 11(2) has disappeared, an opposite electrical current is supplied to the electromagnet 19. In this case, the magnetomotive force H applied to the electromagnet 19 is the same in magnitude and opposite in direction. Thus, the state is shifted from the point P2 to the point P3. Since the residual magnetism of the magnetic piece 20 disappears at the point P3, the attractive force disappears. As a result the mirror 15 is automatically returned to the standby position by elasticity of the support 18.

If the mirror 15 needs to be shifted to the operation position from the standby position again, the same electrical current as used to return the mirror 15 to the standby position is supplied to the electromagnet 19 again. If so, the state is shifted to the point P4. In this state, the magnetic piece 20 is magnetized in an opposite direction to the former case and therefore, the piece 20 is contacted with the electromagnet 19 again by an attractive force generated. Thus, the mirror 15 in question is displaced to the operation position from the standby position.

In this way, the light beam emitted from the fiber 10(1) forming the input array is reflected by the corresponding mirror 15, entering the fiber 11(2) forming the output array.

Subsequently, if the supply of the electrical current to the electromagnet 19 is stopped, the magnetomotive force H is turned to zero and the state is shifted to the point P5. At this time, a residual magnetism is left in the magnetic piece 20 and therefore, the magnetic attractive force remains and the mirror 15 is kept at the operation position.

When the beam emitted from the fiber 10(1) needs not to enter he fiber 11(2), an opposite electrical current is supplied to the electromagnet 19. In this case, the magnetomotive force H applied to the electromagnet 19 is the same in magnitude and opposite in direction. Thus, the state is shifted to the point P6 from the point P5. Because the residual magnetism of the magnetic piece 20 disappears at the point P6, the attractive force disappears. As a result, the mirror 15 is automatically returned to the standby position by elasticity of the support 18.

When the light beam emitted from the J-th fiber 10(J) forming the input array is entered to the N-th fiber 11(N) forming the output array, as shown in FIG. 1, the corresponding mirror 15 can be displaced between the standby and operation positions in the same way as explained above.

If the mirror 15 needs to be kept at the standby or operation position for a long time, it is preferred that an electric current is supplied to the desired electromagnet 19 for a short time at specific intervals. If so, the state of the optical path switched by the mirror 15 can be held stably for a long time.

With the cross-connect optical switch according to the embodiment of the invention, as explained above, each of the mirrors 15 of the mirror array has a reflection plane perpendicular to the bisector L between the X direction along which the input fibers 10 extend and the Y direction along which the output fibers 11 extend. Each of the mirrors 15 is displaceable along the corresponding reflection plane between the operation position and the standby position. Therefore, the angle of the reflection plane is kept constantly. Thus, if the desired mirror 15 is displaced to the operation position while keeping this angle unchanged, the light beam emitted from the corresponding input path 21 can be reflected as desired. If the switching operation is unnecessary, the mirror 15 is placed in the standby position, where the light beam emitted from the corresponding input path 21 is not affected by the mirror 5 in question. As a result, the switching operation is precise and stable.

Because of the same reason as above, it is sufficient that the mirror driver moves the mirrors 15 in the direction D parallel to their reflection planes. In other words, it is sufficient that each of the mirrors 15 is movable in a single direction (i.e., the direction perpendicular to the bisector L), and that the mirror driver moves each mirror 15 in the same direction. Accordingly, the mirror driver and the mirrors 15 are simple in structure. Moreover, since it is sufficient that the mirror driver comprises one electromagnet 19 and one magnetic piece or member 20 for each of the mirrors 15; the count of control lines for the electromagnets 19 will not be too many. As a result, the switch of the invention copes with switching operation between several hundreds of optical input paths and several hundreds of optical output paths.

Furthermore, the mirror driver drives the array of the mirrors 15 electromagnetically, not electrostatically. Thus, the operation of the mirror driver is not susceptible to environmental conditions. As a result, the switch of the embodiment is operable stably against environmental conditions.

To confirm the advantages of the switch according to the invention, the inventor fabricated actually the switch according to the above-described embodiment and then, conducted the following test.

500 single-mode optical fibers were used as the fibers 10 forming the input array extending in the X direction and at the same time, 500 single-mode optical fibers were used as the fibers 11 forming the output array extending in the Y direction. The base 14 was made of an aluminum alloy. The 500 fibers for the input fibers 10 were fixed in such a way as to be arranged along one edge of the base 14 at a pitch of 2000 $\mu$m. The remaining 500 fibers for the output fibers 11 were fixed in such a way as to be arranged along another edge of the base 14 at a pitch of 2000 $\mu$m perpendicular to the fibers 10. Thus, the input array and the output array were formed to intersect perpendicularly.

Optical lenses 16a were located near the respective output ends of the fibers 10 forming the input array. One focus of each lens 16a was set to be in accordance with the output end of the corresponding fiber 10 while the other focus thereof was set to be in accordance with the reflection plane of the mirror 15 located at the furthest position on the corresponding path 21. The focal length for the lenses 16a was 999 mm.

Similarly, optical lenses 16b were located near the respective output ends of the fibers 11 forming the output array. One focus of each lens 16b was set to be in accordance with the output end of the corresponding fiber 11 while the other focus thereof was set to be in accordance with the reflection plane of the mirror 15 located at the furthest position on the corresponding path 22. The focal length for the lenses 16b was 999 mm.

Each of the elastic supports 18 was formed by a thin aluminum plate with a width of 1 mm, a thickness of 0.3 mm, and a height of 12 mm. A mirror surface was formed on one side of the plate at its upper end. Thus, the mirrors 15 were formed. At the top end of each plate, a Fe—Co—Ni alloy piece was attached, forming the magnetic piece 16. These aluminum plates were fixed on the surface of the base 14 in such a way as to be vertical with respect to the base 14. At this time, the supports 18 (i.e., the aluminum plates) and the reflection planes of the mirrors 15 were arranged in the direction D.

Each of the electromagnets 19 was made of a Fe—Co—Ni core and a coil wound around the core.

The distance A between the standby position of the mirror 15 and the corresponding path 21 was set at 30 $\mu$m. The distance B between the standby and operation positions (i.e., the displaceable quantity of the mirror 15) was set at 50 $\mu$m.

The attractive force between the electromagnet 19 and the magnetic piece 20 was set to be greater than 0.5 g.

As a result, by supplying a specific electrical current to the electromagnet 19, it was confirmed that each mirror 15 was able to be displaced between the standby and operation positions. Also, it was confirmed that the above-described switching operation of the optical paths 21 and 22 was realized.

Thereafter, an electrical current was supplied to the desired electromagnet 19 for 10 msec at intervals of two hours. In this case, the mirror 15 in question was able to be held at the desired position (i.e., the standby or operation position). It was confirmed that this state was kept stably for 1000 hours.

At this time, the switching rate for the optical paths 21 and 22 was 10 msec, the extinction ratio was 50 dB or greater, the cross-talk was 50 dB or less, and the optical insertion loss was 7 dB or less.

Accordingly, it was confirmed that a cross-connect optical switch coping with switching operation between several hundreds of optical input paths and several hundreds of optical output paths was realized by the switch according to the invention.

Variations

Needless to say, the present invention is not limited to the above-described embodiment. Any change or modification may be added to them within the spirit of the invention. For example, although the square base 14 is used in the above embodiment, the base 14 may have any other shape, such as rhombus. In the above embodiment, the base 11, the supports 18, and the mirrors 15 are made of aluminum alloy. However, the invention is not limited to this. A copper alloy capable of mirroring processing may be used and gold may be plated to the mirror 15 for this purpose. The supports 18 may be any other form than plate-shaped. It is sufficient that support 18 supports the mirror 15 in such a way that the mirror 15 is displaceable between the standby and operation positions.

Furthermore, in the above embodiment, the input optical fibers 10 are set to be perpendicular to the output optical fibers 11. However, the invention is not limited to this. It is sufficient that the input optical fibers 10 are intersected with the output optical fibers 11 at an angle of not equal to zero, and that the reflection planes of the mirrors 15 are perpendicular to the bisector L.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A cross-connect optical switch comprising:
   (a) an input array of optical input paths arranged in a first direction;
   (b) an output array of optical output paths arranged in a second direction different from the first direction;
   (c) a switching region formed between an output end of the input array and an input end of the output array;
   (d) a mirror array of optical reflection mirrors arranged in the switching region; and
   (e) a mirror driver for driving electromagnetically the mirror array;
   wherein each of the mirrors of the mirror array has a reflection plane perpendicular to a bisector between the first and second directions and is supported in such a way as to be displaceable along the reflection plane between a standby position and an operation position;
   and wherein light beams emitted from the input array are reflected by the corresponding mirrors to be sent to the output array in the operation position, and pass near the corresponding mirrors in the standby position;
   wherein each of the mirrors is attached to an upper end of a elastic supporting member whose lower end is fixed to a base in such a way as to form a vertical cantilever;
   and wherein the mirror driver comprises an electromagnet fixed near each of the mirrors and a magnetic member attached to the upper end of the elastic supporting member;
   and wherein if an electrical current is supplied to the electromagnet, the corresponding magnetic member is magnetized to generate an attraction force;
   and wherein the mirror is displaceable between the standby position and the operation position using the attraction force.

2. The switch according to claim 1, wherein the electromagnet is attached to an upper substrate located approximately parallel to the base.

3. The switch according to claim 2, wherein the upper substrate is made of a transparent material for visible light.

4. The switch according to claim 1, wherein an electromagnet is located on an opposite side to the corresponding mirror with respect to an extension of the corresponding input path.

5. The switch according to claim 1, wherein the standby position of the mirror and the intersection between an extension of the corresponding input path and an extension of the corresponding output path is apart from each other by a distance A in a direction perpendicular to the bisector;
   and wherein the standby and operation positions are apart from each other by a distance B larger than A in the direction perpendicular to the bisector.

6. The switch according to claim 1, wherein an optical lens is provided near each of the output end of the input array and the input end of the output array;
   and wherein one focus of the lens is designed to approximately accord with the output end or the input end and the other focus of the lens is designed to approximately accord with the mirror located at the furthest position on an extension of the corresponding input or output path.

7. The switch according to claim 1, wherein the reflection mirror and an electromagnet are arranged at each of the intersections between the extensions of the optical input paths and the extensions of the optical output paths.

* * * * *